(12) United States Patent
Kawara

(10) Patent No.: US 8,312,282 B2
(45) Date of Patent: Nov. 13, 2012

(54) INFORMATION PROCESSING APPARATUS AND METHOD

(75) Inventor: Satoshi Kawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 12/363,860

(22) Filed: Feb. 2, 2009

(65) Prior Publication Data

US 2009/0199011 A1  Aug. 6, 2009

(30) Foreign Application Priority Data

Feb. 4, 2008 (JP) ................................. 2008-024259

(51) Int. Cl.
*H04L 9/32* (2006.01)
(52) U.S. Cl. ....................................... 713/176; 707/512
(58) Field of Classification Search .................... 713/176
See application file for complete search history.

(56) References Cited

U.S. PATENT DOCUMENTS

| | | | | |
|---|---|---|---|---|
| 4,562,592 A * | 12/1985 | Chainer et al. | ................ | 382/120 |
| 4,789,934 A * | 12/1988 | Gundersen et al. | ........... | 382/120 |
| 5,915,024 A * | 6/1999 | Kitaori et al. | ................. | 713/176 |
| 7,639,818 B2 * | 12/2009 | Fujimoto et al. | .............. | 380/277 |
| 7,716,570 B2 * | 5/2010 | Adelberg et al. | ............. | 715/209 |
| 8,190,902 B2 * | 5/2012 | Lytle et al. | .................... | 713/176 |
| 2002/0099733 A1 * | 7/2002 | Teruuchi et al. | .............. | 707/512 |
| 2002/0147798 A1 * | 10/2002 | Huang | ........................... | 709/220 |
| 2005/0063545 A1 * | 3/2005 | Fujimoto et al. | .............. | 380/277 |
| 2007/0204165 A1 * | 8/2007 | Lytle et al. | .................... | 713/176 |

FOREIGN PATENT DOCUMENTS

| | | |
|---|---|---|
| JP | 2002-229448 | 8/2002 |
| JP | 2005-333233 | 12/2005 |
| WO | 2007/032968 A | 3/2007 |

OTHER PUBLICATIONS

Japanese Office Action, dated Apr. 2, 2012, issued by the Japanese Patent Office, in Japanese Patent Application No. 2008-024259.

* cited by examiner

*Primary Examiner* — Kambiz Zand
*Assistant Examiner* — Dant Shaifer Harriman
(74) *Attorney, Agent, or Firm* — Fitzpatrick, Cella, Harper & Scinto

(57) ABSTRACT

An information processing apparatus includes a classifying unit configured to classify structural elements under predetermined attributes; a storage unit configured to store data, which describes which attribute among the attributes of the structural elements is a target of electronic signature verification, in association with the output destination of a structured document; an attaching unit configured to attach electronic signatures to the structural elements; and an inserting unit configured to refer to the stored data and data of the structured document, generate tree data which corresponds to the output destination of the structured document and indicates which structural element is a target of electronic signature verification among the structural elements to which electronic signatures have been attached, and insert the tree data in the data of the structured document.

8 Claims, 23 Drawing Sheets

ATTRIBUTES EXCLUDED FROM VERIFICATION
  META INFORMATION ATTRIBUTE
  PRINT TICKET ATTRIBUTE
  UNLINKED ELEMENT ATTRIBUTE

◐ ATTRIBUTES TO BE VERIFIED   ○ ATTRIBUTES NOT TO BE VERIFIED

ATTRIBUTES EXCLUDED FROM VERIFICATION
• NONE

◐ ATTRIBUTES TO BE VERIFIED   ○ ATTRIBUTES NOT TO BE VERIFIED

FIG. 8

| SERVER REGISTRATION SCREEN | |
|---|---|
| BASIC SETTINGS | |
| REGISTRATION SERVER NAME | [_____] ~801 |
| IP ADDRESS | [_____] ~802 |
| SIGNATURE VERIFICATION RULE SETTING | ~SETTING OF ATTRIBUTES EXCLUDED FROM VERIFICATION~ |
| ATTRIBUTES EXCLUDED FROM VERIFICATION | ☐ META INFORMATION ~803<br>☐ PRINT TICKET ~804<br>☐ PRINT RANGE EXCLUSION ~805<br>☐ UNLINKED STRUCTURAL ELEMENT ~806 |
| | 807~[ REGISTER ]  [ CANCEL ] |

FIG. 9

SERVER INFORMATION TABLE

| SERVER NAME | SERVER LOCATION INFORMATION | ATTRIBUTE FLAG (ATTRIBUTE EXCLUDED FROM VERIFICATION) | | | |
|---|---|---|---|---|---|
| | | META INFORMATION | PRINT TICKET | PRINTING EXCLUDED | UNLINKED |
| FILE SHARING SERVER | 172.xx.xx.x1 | ○ | ○ | × | ○ |
| CONFIDENTIAL INFORMATION SERVER | 172.xx.xx.x2 | × | × | × | × |
| PULL-PRINT SERVER | 172.xx.xx.x3 | ○ | × | × | ○ |
| PRINTER | 172.xx.xx.x4 | ○ | × | ○ | ○ |

FIG. 11

| DOCUMENT INFORMATION ||||
|---|---|---|---|
| DOCUMENT ID | DOCUMENT NAME | REGISTRATION SERVER NAME | DOCUMENT DATA |
| 0001 | FUNCTION SPECIFICATIONS | FILE SHARING SERVER | ¥¥172.xx.xx01¥¥ FOLDER1 |
| 0002 | DAMAGE REPORT | CONFIDENTIAL INFORMATION SERVER | ¥¥172.xx.xx01¥¥ FOLDER3 |
| ⋮ | ⋮ | ⋮ | ⋮ |

F I G. 12A

```
<FixedDocumentSequence>
    <Relationship Type="FixedDocument"  Target="/FixedDocument1.fdoc"/>
    <Relationship Type="FixedDocument"  Target="/FixedDocument2.fdoc"/>
    <Relationship Type="printticket"    Target="/Job_PT.xml"/>
    <Relationship Type="CoreProperty"   Target="/Core_Property.xml"/>
</FixedDocumentSequence>
```

F I G. 12B

```
<FixedDocument>
    <Relationship Type="FixedDocument"  Target="Pages1.fpage"/>
    <Relationship Type="FixedDocument"  Target="Pages2.fpage"/>
</FixedDocument>
```

F I G. 12C

```
<PrintTicket>
    <Feature name="PageMediaSize">
        <Option name="A4"/>
    </Feature>
    <Feature name="PageOrientation">
        <Option name="Portrait"/>
    </Feature>
    <Feature name="PrintRange">
        <Option name="FixedDocument1.fdoc"/>
    </Feature>
    <Feature name="Print Style">
        <Option name="Saddle Stitch Booklet"/>
    </Feature>
</PrintTicket>
```

F I G. 12D

```
<cp:coreProperties>
    <dc:creator>suzuki</dc:creator>
    <cp:lastModifiedBy>suzuki</cp:lastModifiedBy>
    <cp:revision>1</cp:revision>
    <dcterms:created>20xx-12-20</dcterms:created>
    <dcterms:modified>20xx-12-20</dcterms:modified>
</cp:coreProperties>
```

FIG. 14A

```
<FixedDocumentSequence>
        <Relationship Type="FixedDocument"   Target="/FixedDocument1.fdoc"/>
        <Relationship Type="FixedDocument"   Target="/FixedDocument2.fdoc"/>
        <Relationship Type="printticket"     Target="/Job_PT.xml"/>
        <Relationship Type="CoreProperty"    Target="/Core_Property.xml"/>
        <Relationship Type="DigtalSignature" Target="/Signature1"/>
</FixedDocumentSequence>
```

FIG. 14B

```
<FixedDocument>
        <Relationship Type="FixedDocument"   Target="Pages1.fpage"/>
        <Relationship Type="FixedDocument"   Target="Pages2.fpage"/>
        <Relationship Type="DigtalSignature" Target="/Signature2"/>
</FixedDocument>
```

FIG. 14C

```
<PrintTicket>
        <Feature name="PageMediaSize">
                <Option name="A4"/>
        </Feature>
        <Feature name="PageOrientation">
                <Option name="Portrait"/>
        </Feature>
        <Feature name="PrintRange">
                <Option name="FixedDocument1.fdoc"/>
        </Feature>
        <Feature name="Print Style">
                <Option name="Saddle Stitch Booklet"/>
        </Feature>
        <Relationship Type="DigtalSignature"  Target="/Signature3"/>
</PrintTicket>
```

FIG. 14D

```
<cp:coreProperties>
        <dc:creator>suzuki</dc:creator>
        <cp:lastModifiedBy>suzuki</cp:lastModifiedBy>
        <cp:revision>1</cp:revision>
        <dcterms:created>20xx-12-20</dcterms:created>
        <dcterms:modified>20xx-12-20</dcterms:modified>
        <Relationship Type="DigtalSignature"  Target="/Signature4"/>
</cp:coreProperties>
```

F I G. 15

| PART NAME | TAG NAME | TREE INFORMATION | | ATTRIBUTE INFORMATION | | | | VERIFICATION TARGET INFORMATION |
|---|---|---|---|---|---|---|---|---|
| | | PARENT | CHILD | META INFORMATION | PRINT TICKET | PRINT RANGE EXCLUSION | UN-LINKED | |
| FixedDocument Sequence | FixedDocument Sequence | Root | FixedDocument1 FixedDocument2 Job_PT Core_Property | × | × | × | × | ○ |
| FixedDocument1 | FixedDocument | FixedDocument Sequence | FixedPage1 FixedPage2 | × | × | × | × | ○ |
| FixedPage1 | FixedPage | FixedDocument1 | Resource1 Resource2 | × | × | × | × | ○ |
| Resource1 | Resource | FixedPage1 | — | × | × | × | × | ○ |
| Resource2 | Resource | FixedPage1 FixedPage2 | — | × | × | × | × | ○ |
| FixedPage2 | FixedPage | FixedDocument1 | Resource2 | × | × | × | × | ○ |
| FixedDocument2 | FixedDocument | FixedDocument Sequence | FD_PT | × | × | ○ | × | ○ |
| FD_PT | PrintTicket | FixedDocument2 | — | × | ○ | ○ | × | × |
| Job_PT | PrintTicket | FixedDocument Sequence | — | × | ○ | × | × | × |
| Core_Property | CoreProperty | FixedDocument Sequence | — | ○ | × | × | × | × |
| FixedPage4 | FixedPage | — | — | × | × | ○ | ○ | × |

FIG. 16

| ATTRIBUTE CLASSIFICATION TABLE ||
|---|---|
| ATTRIBUTE | XPS Tag NAME |
| META INFORMATION | CoreProperty |
| PRINT TICKET | PrintTicket |

F I G. 17A

```
<SignatureTree>
  <FDS>
    <Type="FDS" Target="FixedDocumentSequencefdeq"
      MetaFlag="false", PTFlag="false" NotPrintRangeFlag="false" NotLinkFlag="false" Sign="True"/>
    <FD>
      <Type="Document" Target="FixedDocument1.fdoc"
        MetaFlag="false", PTFlag="false" NotPrintRangeFlag="false" NotLinkFlag="false" Sign="True"/>
      <FP>
        <Type="Document" Target="FP1.fpage"
          MetaFlag="false", PTFlag="false" NotPrintRangeFlag="false" NotLinkFlag="false" Sign="True"/>
        <Res>
          <Type="Resource" Target="Resource1"
            MetaFlag="false", PTFlag="false" NotPrintRangeFlag="false" NotLinkFlag="false" Sign="True"/>
          <Type="Resource" Target="Resource2"
            MetaFlag="false", PTFlag="false" NotPrintRangeFlag="false" NotLinkFlag="false" Sign="True"/>
        </Res>
      </FP>
      <FP>
        <Type="Document" Target="FP2.fpage"
          MetaFlag="false", PTFlag="false" NotPrintRangeFlag="false" NotLinkFlag="false" Sign="True"/>
        <Res>
          <Type="Resource" Target="Resource2"
            MetaFlag="false", PTFlag="false" NotPrintRangeFlag="false" NotLinkFlag="false" Sign="True"/>
        </Res>
      </FP>
    </FD>
```

FIG. 17B

```
<FD>
  <PT>
    <Type="PrintTicket" Target="FD_PT.xml"
        MetaFlag="false", PTFlag="True" NotPrintRangeFlag="false" NotLinkFlag="false" Sign="False"/>
  </PT>
</FD>
<PT>
  <Type="PrintTicket" Target="Job_PT.xml"
      MetaFlag="false", PTFlag="True" NotPrintRangeFlag="false" NotLinkFlag="false" Sign="False"/>
</PT>
<MetaData>
  <Type="MetaData"  Target="Core_Property.xml"
      MetaFlag="True", PTFlag="false" NotPrintRangeFlag="false" NotLinkFlag="false" Sign="False"/>
</MetaData>
</FDS>
<FP>
  <Type="Document" Target="FP3.fpage"
      MetaFlag="false", PTFlag="false" NotPrintRangeFlag="True" NotLinkFlag="True" Sign="False"/>
</FP>
</SignatureTree>
```

FIG. 18

```
<FixedDocumentSequence>
    <Relationship Type="FixedDocument"    Target="/FixedDocument1.fdoc"/>
    <Relationship Type="FixedDocument"    Target="/FixedDocument2.fdoc"/>
    <Relationship Type="printticket"      Target="/Job_PT.xml"/>
    <Relationship Type="CorePropery"      Target="/Core_Property.xml"/>
    <Relationship Type="DigtalSignature"  Target="/Signature1"/>
    <Relationship Type="SignatureTree"    Target="/SignatureTree"/>
</FixedDocumentSequence>
```

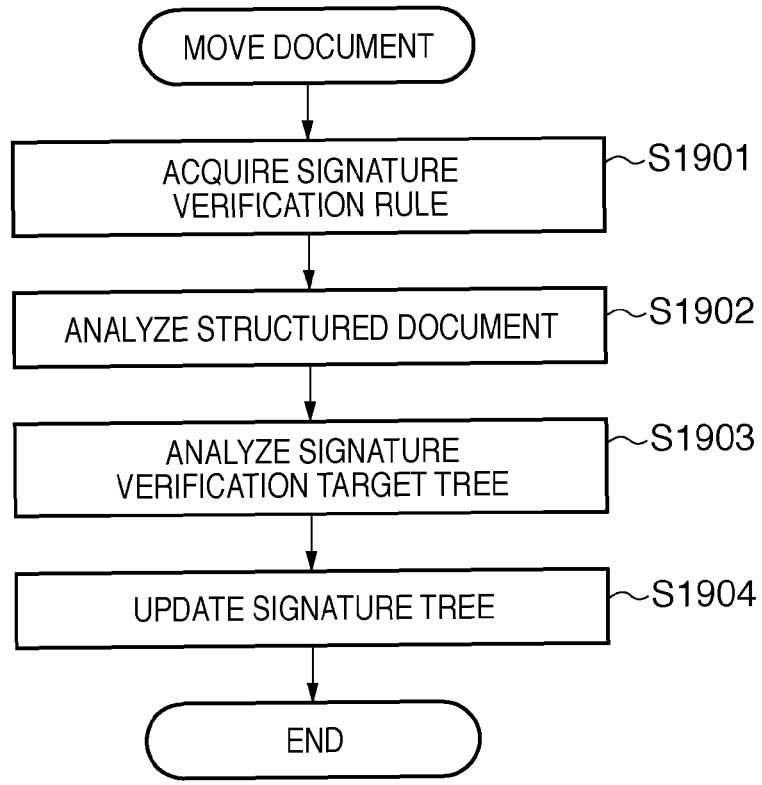

| TAG NAME | TREE INFORMATION | | ATTRIBUTE INFORMATION | | | | | VERIFICATION TARGET INFORMATION |
|---|---|---|---|---|---|---|---|---|
| | PARENT | CHILD | META INFORMATION | PRINT TICKET | PRINT RANGE EXCLUSION | UNLINKED | | |
| FixedDocument Sequence | Root | FixedDocument1 FixedDocument2 Job_PT Core_Property | × | × | × | × | | ○ |
| FixedDocument | FixedDocument Sequence | FixedPage1 FixedPage2 | × | × | × | × | | ○ |
| FixedPage | FixedDocument1 | Resource1 Resource2 | × | × | × | × | | ○ |
| Resource | FixedPage1 | — | × | × | × | × | | ○ |
| Resource | FixedPage1 FixedPage2 | — | × | × | × | × | | ○ |
| FixedPage | FixedDocument1 | Resource2 | × | × | ○ | × | | ○ |
| FixedDocument | FixedDocument Sequence | FD_PT | × | ○ | ○ | × | | ○ |
| PrintTicket | FixedDocument2 | — | × | ○ | × | × | | ○ |
| PrintTicket | FixedDocument Sequence | — | × | × | × | × | | ○ |
| CoreProperty | FixedDocument Sequence | — | ○ | × | × | × | | ○ |
| FixedPage | — | — | × | × | ○ | ○ | | ○ |

F I G. 21A

```
<SignatureTree>
  <FDS>
    <Type="FDS" Target="FixedDocumentSequencefdeq"
      MetaFlag="false" , PTFlag="false" NotPrintRangeFlag="false" NotLinkFlag="false" Sign="True"/>
    <FD>
      <Type="Document" Target="FixedDocument1.fdoc"
        MetaFlag="false" , PTFlag="false" NotPrintRangeFlag="false" NotLinkFlag="false" Sign="True"/>
      <FP>
        <Type="Document" Target="FP1.fpage"
          MetaFlag="false" , PTFlag="false" NotPrintRangeFlag="false" NotLinkFlag="false" Sign="True"/>
        <Res>
          <Type="Resource" Target="Resource1"
            MetaFlag="false" , PTFlag="false" NotPrintRangeFlag="false" NotLinkFlag="false" Sign="True"/>
          <Type="Resource" Target="Resource2 "
            MetaFlag="false" , PTFlag="false" NotPrintRangeFlag="false" NotLinkFlag="false" Sign="True"/>
        </Res>
      </FP>
      <FP>
        <Type="Document" Target="FP2.fpage"
          MetaFlag="false" , PTFlag="false" NotPrintRangeFlag="false" NotLinkFlag ="false" Sign="True"/>
        <Res>
          <Type="Resource" Target="Resource2"
            MetaFlag="false" , PTFlag="false" NotPrintRangeFlag="false" NotLinkFlag="false" Sign="True"/>
        </Res>
      </FP>
    </FD>
```

F I G. 21B

```
<FD>
  <PT>
    <Type="PrintTicket" Target="FD_PT.xml"
      MetaFlag="false", PTFlag="True" NotPrintRangeFlag="false" NotLinkFlag="false" Sign="True"/>
  </PT>
</FD>
<PT>
  <Type="PrintTicket" Target="Job_PT.xml"
    MetaFlag="false", PTFlag="True" NotPrintRangeFlag="false" NotLinkFlag="false" Sign="True"/>
</PT>
<MetaData>
  <Type="MetaData"  Target="Core_Property.xml"
    MetaFlag="True", PTFlag="false" NotPrintRangeFlag="false" NotLinkFlag="false" Sign="True"/>
</MetaData>
</FDS>
<FP>
  <Type="Document" Target="FP3.fpage" Sign="True
    MetaFlag="false", PTFlag="false" NotPrintRangeFlag="True" NotLinkFlag="True" Sign="True"/>
</FP>
</SignatureTree>
```

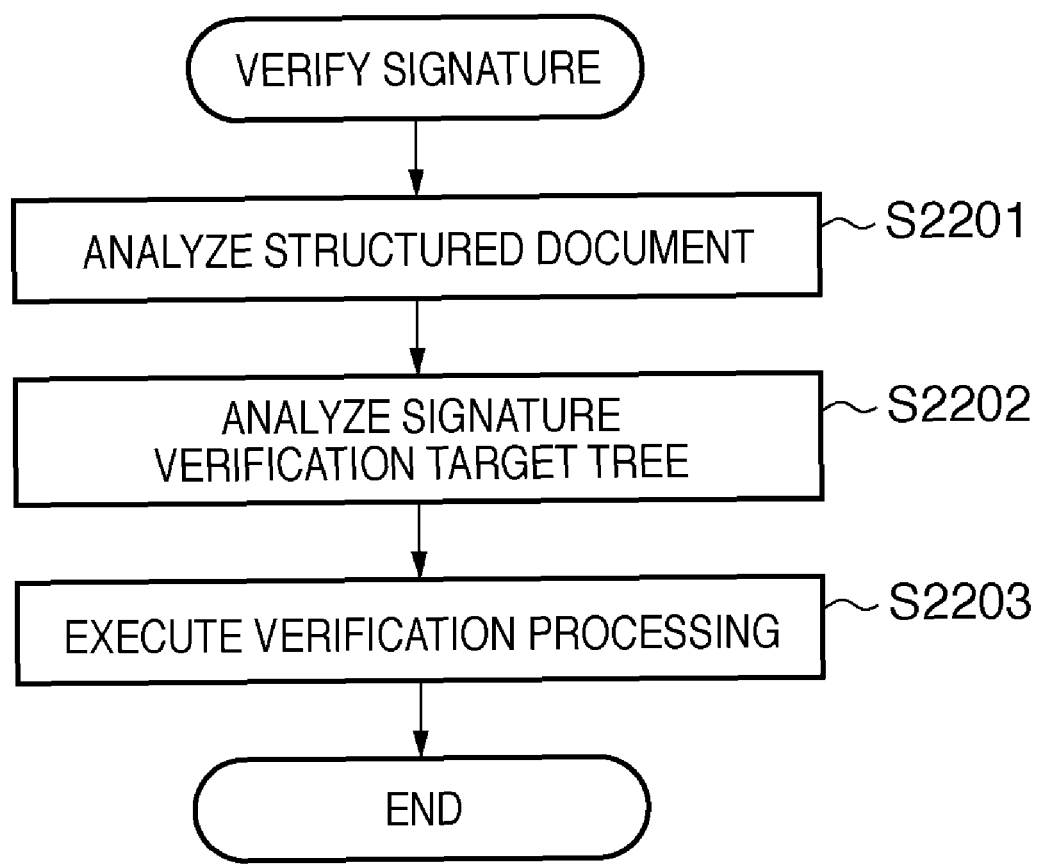

INFORMATION PROCESSING APPARATUS AND METHOD

BACKGROUND OF THE INVENTION

1. Field of the Invention

The present invention relates to an information processing apparatus for adding a signature to an electronic file and method thereof.

2. Description of the Related Art

Electronic signature techniques are utilized to certify the creator of an electronic file and to assure that the electronic file has not been altered. For example, an electronic file or a digest thereof is encrypted and the encrypted value is added to the original electronic file to achieve the addition of an electronic signature. When an electronic signature is verified, the encrypted electronic file or digest value is decrypted. If the original electronic file or its digest and the decrypted value are the same, this assures that alteration has not taken place. Although it is possible with this electronic signature technique to verify whether or not alteration has taken place with regard to the entire document, it is not possible to specify which portion of an electronic file has been altered if alteration has taken place.

In order to solve this problem in an XML or other structured document, the specification of Japanese Patent Application Laid-Open No. 2002-229448 describes a technique for generating a signature from each of the structural elements that constitute the structured document and combining the generated signatures (codes) into a single signature that corresponds to the structure.

Further, consider a case where the information of a structured document is stored in a database or the like and utilized by a back-end system, etc. In this case, information such as spaces and tabs at the beginning and end of content in a structured document is treated as invalid data and the structured-document information is stored in a database after this invalid data is deleted by a technique such as trimming. As a consequence, when the original structured document is reconstructed from the information stored in the database, a situation in which the space and tab information, etc., is missing is conceivable. When the signature of a signed structured document stored in the database is verified in such case, the document will be determined to have been altered owing to the missing spaces and tabs, etc.

As a method of solving this problem, the specification of Japanese Patent Application Laid-Open No. 2005-333233 describes a signature technique whereby a signature is applied to a structured document upon extracting valid signature-target data obtained by deleting space and tab data, etc., which was originally included in order to facilitate readability, from the signature-target data. The application also describes a technique for verifying a signature upon extracting valid signature-target data obtained by deleting space and tab data, etc., from signature-target data.

There are also occasions where a structured document contains data unrelated to printing. Examples which can be mentioned are meta information such as creation date and time and creator name, and structural elements that have not actually been linked. In addition, XPS (XML Paper Specification) is one example of a structured document format. XPS is a structured document format developed by Microsoft Corporation and is composed of XML, which holds information such as document structure, rendering information and print settings (print ticket), and various parts referred to as binary resources such as bitmaps and fonts. In such a structured document, even a change in print settings will result in a determination that the document has been altered if a signature has been applied to the entire electronic document. Since it is easy to add an electronic signature to every structural element of a document because of the specifications of XPS, it is believed that applications and systems that apply a signature to every structural element will become more widespread in the future.

There are cases where it is desired to change dynamically, depending upon the location (storage location) of an electronic document, the scope of guarantee afforded to the document by an electronic signature. For example, consider a case where a document, the creation of which is in progress, is stored in a shared server (or folder) that does not have a high level of security, and then the document is moved to a high-security folder upon completion. In such a case, meta information and print settings, etc., contained in the electronic document need not be guaranteed when in the shared folder not having the high level of security. However, if the electronic document exists in the server (or folder) having the high level of security, it is preferred that the entire electronic document be covered by the scope of the guarantee. That is, there is demand for a system in which the scope of a guarantee (verification) is changed dynamically depending upon the document location (URL, IP address, folder, etc.) when the document is stored and moved.

However, in order to change the scope of a guarantee dynamically in accordance with the storage destination of a document as mentioned above, the following problem arises in the prior art: Specifically, in Japanese Patent Application Laid-Open No. 2002-229448, the addition and verification of an electronic signature in relation to a structured document is carried out in accordance with the depth level of each structural element in a tree. As a consequence, depending upon the depth level of a tree, such as print settings, a structural element for which a decision as to whether the element is necessary or not cannot be made one to which the guarantee does not apply. Further, when a signature is attached, it is necessary to decide the scope of verification and the scope of the guarantee cannot be changed dynamically. Further, according to Japanese Patent Application Laid-Open No. 2005-333233, the application of a signature to a structured document is carried out upon extracting effective signature-target data (e.g., data from which spaces and tabs, etc., have been deleted) in line with a predetermined rule. In addition, at the time of verification as well, the effective signature data is verified upon being extracted in line with the rule used when the signature was attached. As a result, it is necessary to decide the scope of verification when the signature is attached and scope of the guarantee cannot be changed dynamically.

SUMMARY OF THE INVENTION

The present invention provides an information processing apparatus in which the scope of verification can be changed dynamically depending upon the location of the document when the document is stored and moved.

The present invention in its first aspect provides an information processing apparatus for attaching an electronic signature to every structural element constituting a structured document, comprising: a classifying unit configured to classify the structural elements under predetermined attributes; a storage unit configured to store data, which describes which attribute among the attributes of the structural elements is a target of electronic signature verification, in association with an output destination of the structured document; an attaching unit configured to attach electronic signatures to the structural elements; and an inserting unit configured to refer to the data stored by the storage unit and data of the structured document, generate tree data which corresponds to the output destination of the structured document and indicates which structural element is a target of electronic signature verification among the structural elements to which electronic signatures have been attached, and insert the tree data in the data of the structured document.

The present invention in its second aspect provides an information processing method executed in an information processing apparatus for attaching an electronic signature to every structural element constituting a structured document, comprising: a classifying step of classifying the structural elements under predetermined attributes; a storage step of storing data, which describes which attribute among the attributes of the structural elements is a target of electronic signature verification, in association with an output destination of the structured document; an attaching step of attaching electronic signatures to the structural elements; and an inserting step of referring to the data stored at the storage step and data of the structured document, generating tree data which corresponds to the output destination of the structured document and indicates which structural element is a target of electronic signature verification among the structural elements to which electronic signatures have been attached, and inserting the tree data in the data of the structured document.

In accordance with the present invention, the scope of verification can be changed dynamically depending upon the location of a document when the document is stored and moved.

Further features of the present invention will become apparent from the following description of exemplary embodiments with reference to the attached drawings.

BRIEF DESCRIPTION OF THE DRAWINGS

FIG. 8 is a diagram illustrating an example of a server registration screen in a server management application;

FIG. 9 is a diagram illustrating a server information table according to this embodiment;

FIG. 11 is a diagram illustrating document information associating electronic document names, electronic document registration destinations and documents registered;

FIG. 12A is a first diagram illustrating a portion of the internal structure of the XPS file shown in FIG. 4;

FIG. 12B is a second diagram illustrating a portion of the internal structure of the XPS file shown in FIG. 4;

FIG. 12C is a third diagram illustrating a portion of the internal structure of the XPS file shown in FIG. 4;

FIG. 12D is a fourth diagram illustrating a portion of the internal structure of the XPS file shown in FIG. 4;

FIG. 14A is a first diagram illustrating an XML structure in which an electronic signature has been applied to each structural element in the XML structure shown in FIG. 12A;

FIG. 14B is a second diagram illustrating an XML structure in which an electronic signature has been applied to each structural element in the XML structure shown in FIG. 12B;

FIG. 14C is a third diagram illustrating an XML structure in which an electronic signature has been applied to each structural element in the XML structure shown in FIG. 12C;

FIG. 14D is a fourth diagram illustrating an XML structure in which an electronic signature has been applied to each structural element in the XML structure shown in FIG. 12D;

FIG. 15 is a diagram illustrating internal configuration information in this embodiment;

FIG. 16 is a diagram illustrating an attribute classification table associating tag names and attributes;

FIGS. 17A and 17B are diagrams illustrating an example in which the internal configuration information shown in FIG. 15 is placed in the form of XML;

FIG. 18 is a diagram illustrating an example of XPS containing a signature target tree;

FIG. 19 is a flowchart illustrating processing for updating a signature verification target tree in a case where the registration destination of a document has been moved by a document application;

FIG. 20 is a diagram illustrating an example in which the internal configuration information shown in FIG. 15 has been updated;

FIGS. 21A and 21B are diagrams illustrating an example in which the internal configuration information shown in FIG. 20 is placed in the form of XML; and FIG. 22 is a flowchart illustrating verification processing in a case where document verification has been designated by a document application.

DESCRIPTION OF THE EMBODIMENTS

Figure 1:
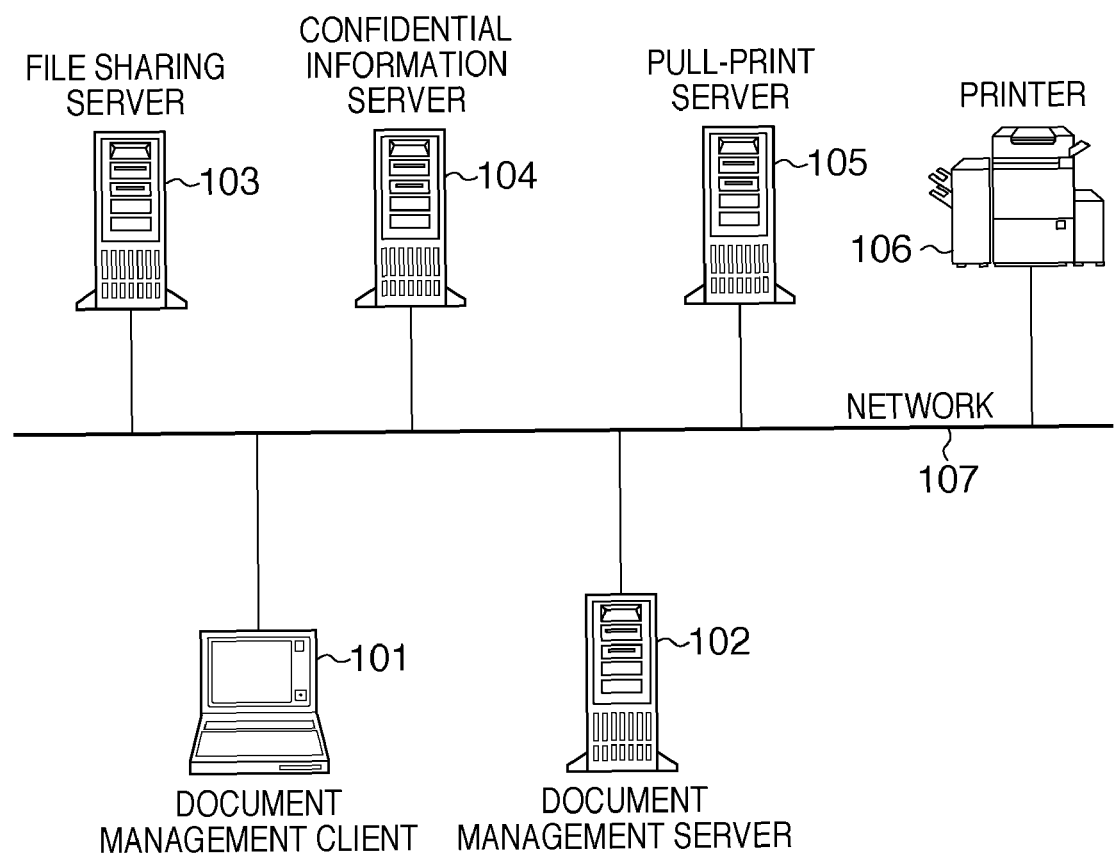
FIG. 1 is a diagram illustrating the block configuration of an information processing system to which the present invention is applied.

Preferred embodiments of the present invention will now be described in detail with reference to the drawings. It should be noted that identical structural elements are designated by like reference characters.

First Embodiment

FIG. 1 is a block diagram for describing the configuration of an information processing system to which the present invention is applicable. A document management client 101, document management server 102, file sharing server 103, confidential information server 104, pull-print server 105 and printer 106 in this system are interconnected. A plurality of these units may be provided. The document management client 101, document management server 102, file sharing server 103, confidential information server 104 and pull-print server 105 in FIG. 1 are information processing apparatus and each is capable of executing various programs such as application programs. The printer 106 also is an information processing apparatus and is capable of executing various programs such as application programs. Further, the document management client 101, document management server 102, file sharing server 103, confidential information server 104, pull-print server 105 and printer 106 are connected to a network 107 via cables and can communicate with one another. A LAN, WAN or the Internet is used as the network 107.

The document management client 101 is used in a case where registration of the various servers (file sharing server 103, confidential information server 104, etc.) connected to the document management server 102 is carried out. Further, an electronic signature verification rule (described later) for each server is created by the document management client 101 and can be registered in the document management server 102. The document management client 101 requests the document management server 102 to register electronic documents, display a list of registered electronic documents and move electronic documents, etc. As a result, electronic documents can be registered in each of the various registered servers, a list of the documents can be displayed on these servers and the documents can be moved to these servers.

The document management server 102 is an application server for managing users, documents, the various connected servers and printer information and is capable of archiving and referring to document-related information, for example, the owning user, document ID and document file, etc. Further, the document management server 102 recognizes a document registration destination and move destination requested by the document management client 101 and adds electronic signature verification information to the electronic document data based upon an electronic signature verification rule (described later) corresponding to each server. In addition, the document management server 102 is capable of registering a document in and moving it to a specified server. The document management server 102 may be furnished with a web server function and may be adapted so that it can be accessed from the document management client 101 using a web browser. Alternatively, an arrangement may be adopted in which a connection is made to the document management server 102 from within a special-purpose application (not necessarily a web browser), which runs on the document management client 101, using a communication protocol such as TCP/IP or HTTP. In such case there is no particular limitation upon the communication protocol used.

The file sharing server 103, confidential information server 104, pull-print server 105 and printer 106 are information devices each having a file server function. In particular, the printer 106 also has a printing function. In the present invention, no other special components are particularly required.

Figure 2:
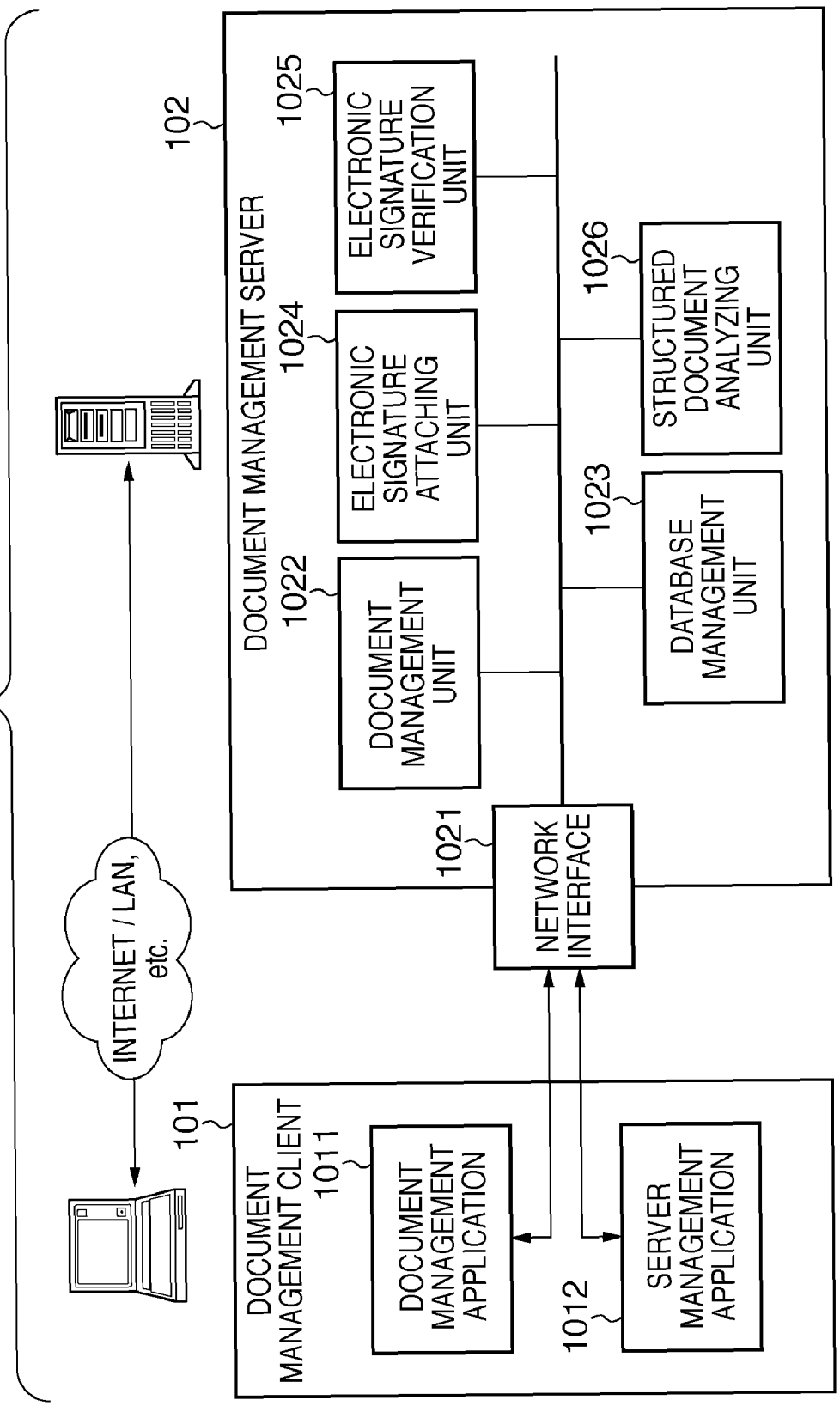
FIG. 2 is a diagram illustrating the module configuration of a document management client and document management server in an embodiment of the present invention.

FIG. 2 is a diagram useful in describing the module configuration of the document management client 101 and document management server 102 in the present invention. The principal modules will be described first. A document management application 1011 is one that runs on the document management client 101 and requests the document management server 102 to register electronic documents, display a list registered documents and move registered documents. As a result, various servers registered in the document management server 102 register electronic documents, display a list thereof and move electronic documents. A server management application 1012 registers and deletes various servers (the file sharing server 103, etc.) connected to the document management server 102. The server management application 1012 creates electronic signature verification rules (described later) for each server and registers the rule in the document management server 102.

The document management server 102 includes a network interface 1021 serving as means for connecting to the network 107, and a document management unit 1022 for controlling the operation of the document management server 102. Further, the document management server 102 includes a database management unit 1023 for managing the information of various servers that have been registered in the document management server 102, electronic signature verification rules (described later) for the various servers, and document information that has been registered. The document management server 102 further includes an electronic signature attaching unit 1024 for attaching electronic signature verification information (described later) based upon the electronic signature verification rules that have been set for the various servers. The document management server 102 further includes an electronic signature verification unit 1025 for performing electronic signature verification based upon electronic signature verification information, and a structured document analyzing unit 1026 for analyzing the structure of a structured document when the electronic signature attaching unit 1024 and electronic signature verification unit 1025 execute processing.

<Example of Hardware Configuration>

Figure 3:
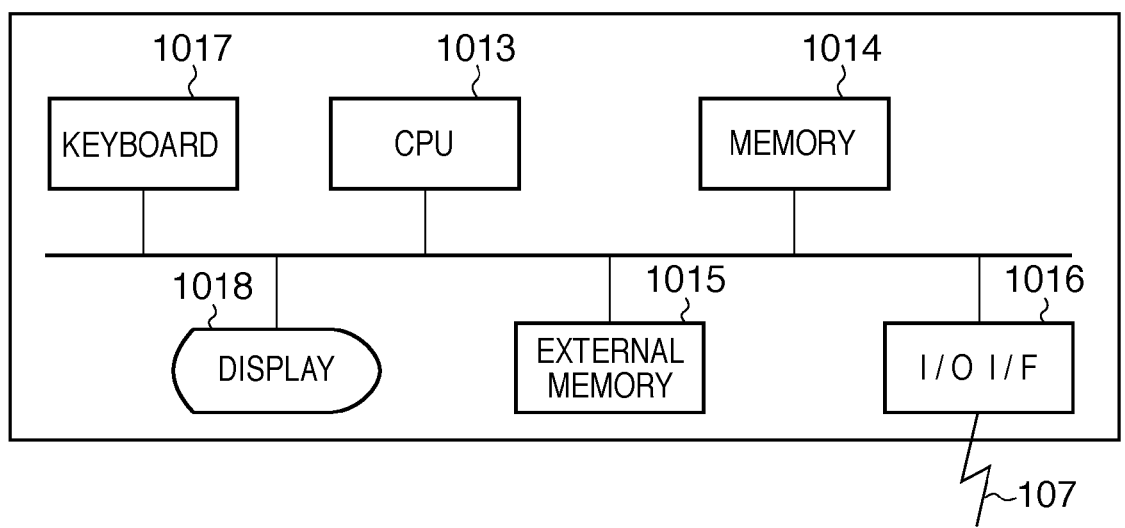
FIG. 3 is a diagram illustrating the hardware configuration of an information processing apparatus capable of being used as a document management client or document management server.

FIG. 3 is a diagram illustrating the hardware configuration of an information processing apparatus capable of being used as the document management client 101 or document management server 102. The functions of the document management client 101 and document management server 102 are implemented by executing a program, which has been stored in a memory 1014, using a CPU 1013 in FIG. 3. The program for implementing the arrangement of FIG. 2 is stored in an external memory 1015 such as a hard disk. The external memory 1015 may employ a removable storage medium such as a flexible disk or CD-ROM. A display 1018 displays images and is connected to the network 107, etc., via an input/output interface 1016. An operator can make inputs by a keyboard (or pointing device, etc.) 1017. The file sharing server 103, confidential information server 104 and pull-print server 105 have the same structure. The printer 106, besides having the structure described above, is also capable of printing in accordance with print commands from various information devices. A memory equivalent to the external memory 1015 capable of storing documents may be constructed within the printer 106.

User operation and the content of operation of each system conforming thereto according to this embodiment will be described next. A user who registers (stores) a document desired to be managed designates the document desired to be registered and the registration location using the document management client 101 and notifies the document management server 102 via the network 107. The document management server 102 stores the document at the designated location upon applying an electronic signature based upon the notification. At this time signature verification information conforming to the registration destination is stored in the document based upon an electronic signature verification rule, described later.

In a case where a registered document is viewed, the document management client 101 acquires a document list from the document management server 102 and displays the list. The user can designate a document desired to be viewed from the document list and can view the document. In a case where the electronic signature of the selected document is verified, the document management client 101 requests the document management server 102 to execute processing for verifying the electronic signature. The document management server 102 executes signature verification processing based upon signature verification information that is retained in the document. The signature verification information will be described later.

In a case where a registered document is moved, the document management client 101 acquires a document list from the document management server 102 and displays the list. The user can designate a document desired to be moved from the document list as well as the destination to which it is to be moved. At this time, based upon an electronic signature verification rules (described later), the signature verification information is updated in accordance with the destination of document movement. In this embodiment, the invention will be described taking XPS as an example of a structured document. The XPS format will be described in brief below. Although XPS signature attachment and verification are described in this embodiment, it should be noted that the present invention is applicable to other structured documents as well.

Figure 4:
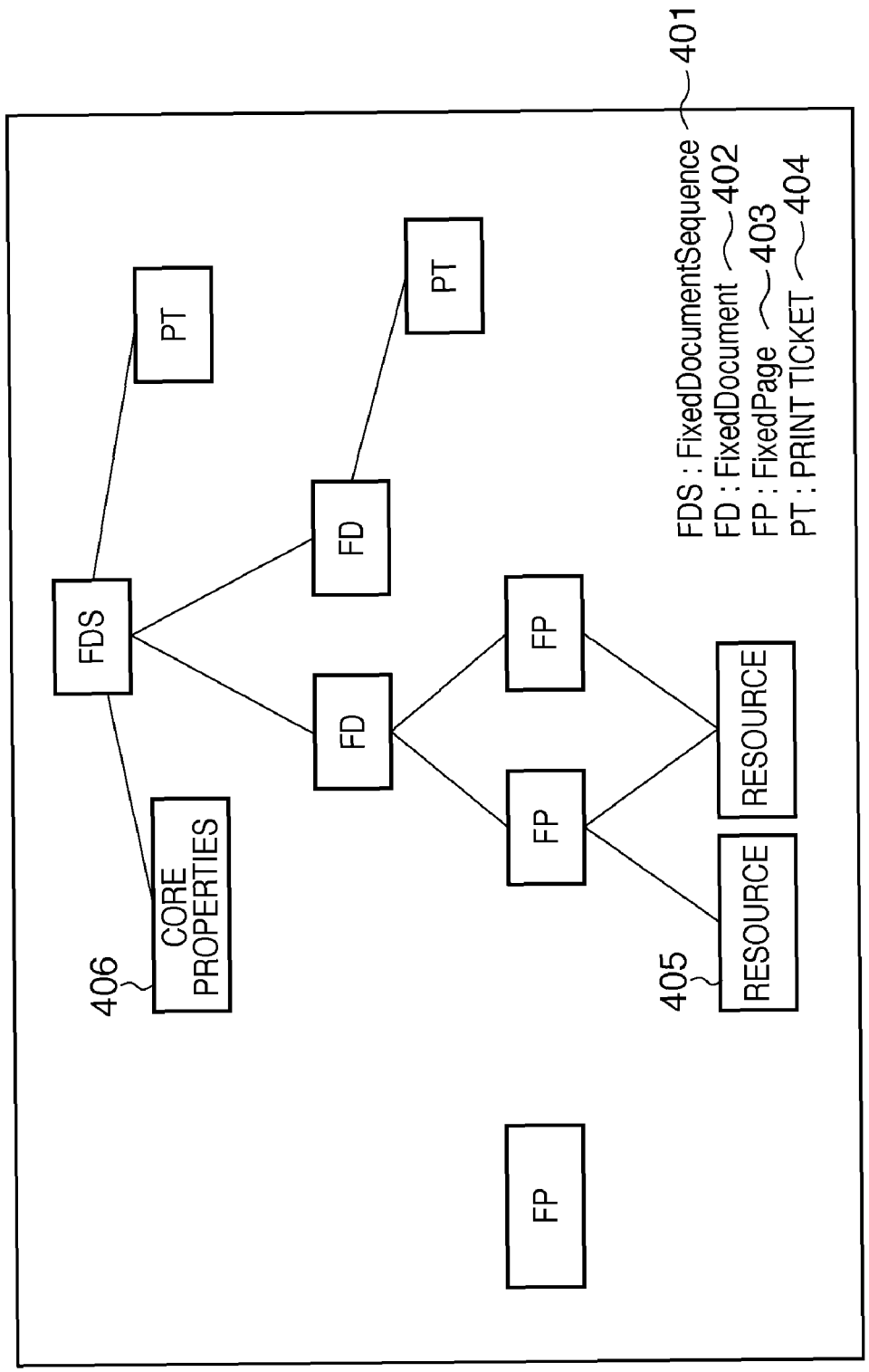
FIG. 4 is a diagram illustrating the concept of an XPS file.

FIG. 4 is a conceptual view of an XPS file. An FDS (Fixed Document Sequence) part 401, FD (Fixed Document) part 402 and FP (Fixed Page) 403 may be understood as a job, document and page, respectively. One FDS part 401 always exists and holds a plurality of FD parts 402. Each FD part 402 holds a plurality of FP parts 403. Print settings can be associated with any of the FDS part 401, FD part 402 and FP part 403. The print settings are referred to as print tickets 404. Print settings associated with the FDS part 401 are referred to as a job-level print ticket, print settings associated with the FD part 402 are referred to as a document-level print ticket, and print settings associated with the FP part 403 are referred to as a page-level print ticket. The job-level print ticket performs the print settings of a job, the document-level print ticket performs the print settings of a document, and the page-level print settings performs print settings of a page. Resources 405 are binary resources such as fonts and bitmaps. Core properties 406 hold meta information, namely creation date and time and creator, as well as date and time of last printing.

Figure 5:
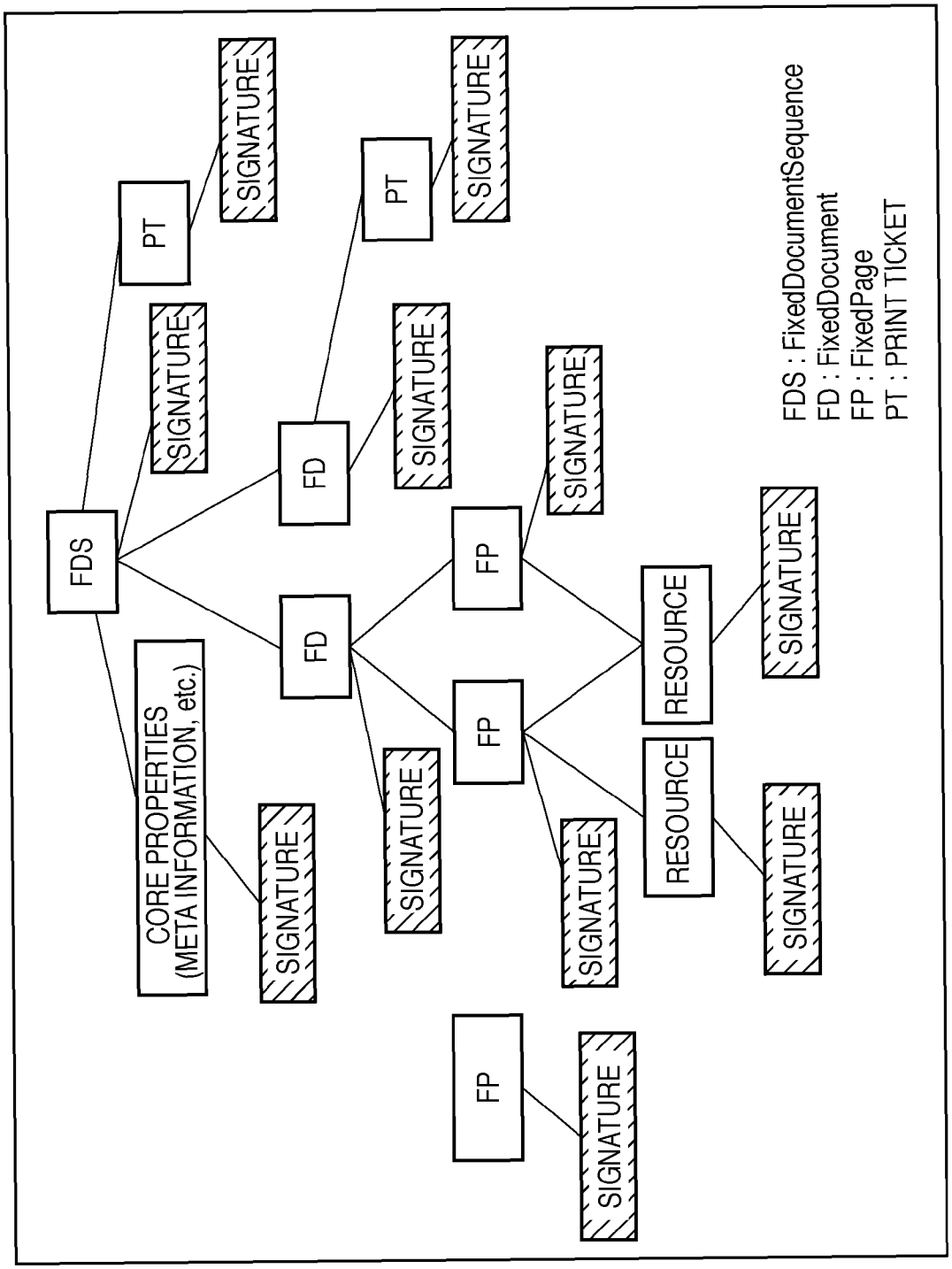
FIG. 5 is a diagram illustrating a case where a signature has been applied to each part of an XPS file shown in FIG. 4.

FIG. 5 is a conceptual view of a case where a signature has been applied to each part in the conceptual view of the XPS file shown in FIG. 4. If the XPS file is printed in this state, the date and time of last printing in the core properties will be updated. If signature verification is performed, therefore, an "altered" determination will be made. Similarly, an "altered" determination will be made if signature verification is performed after print settings are changed.

The concept of an electronic signature verification rule will be described next. Although XPS will be described as an example of a structured document here as well, it should be noted that the present invention is also applicable to other structured documents. For each of the various servers connected to the document management server 102, a rule is selected from the rules set forth below (a plurality of these rules may be combined). The rule decides which structural element from among the structural elements that constitute the structured document is a structural element that is not a verification target (namely a structural element not regarded as having been altered even if it has been altered). Specifically, the rules in this embodiment are a "meta information attribute verification exclusion rule", a "print ticket attribute verification exclusion rule", a "printing range exclusion attribute verification exclusion rule" and an "unlinked element attribute verification exclusion rule". In this embodiment, electronic signature verification information is inserted into an electronic document based upon these rules, and whenever a rule is changed, the electronic signature verification information is updated (changed). As a result, the scope of signature verification can be changed. These rule attributes are referred to as electronic signature verification rules in this invention. Each rule will now be described in brief. The content of electronic signature verification information actually inserted into a document and the method of insertion will be described later.

"Meta Information Attribute"

This is a rule that excludes meta information such as creation date and time, creator and last printing date and time, etc., from verification. The core properties in XPS apply to this attribute.

"Print Ticket Attribute (PT Attribute)"

This is a rule that excludes various print settings information, such as the layout used at the time of printing, from verification. A print ticket in XPS is applicable to this attribute.

"Print Range Exclusion Attribute"

This is a rule that excludes from verification a structural element to which a print range does not apply in a case where printing of part of a document has been set (e.g., a case where there are three pages in the document but printing up to the second page only has been set in the print settings of the print ticket).

"Unlinked Element Attribute"

This is a rule that excludes from verification a structural element in which the uppermost level of the tree has not been connected to "Root" in a tree structure of the structured document. If an expression is changed, the structural element becomes a trash structural element to which no link has been connected.

Figure 6A:
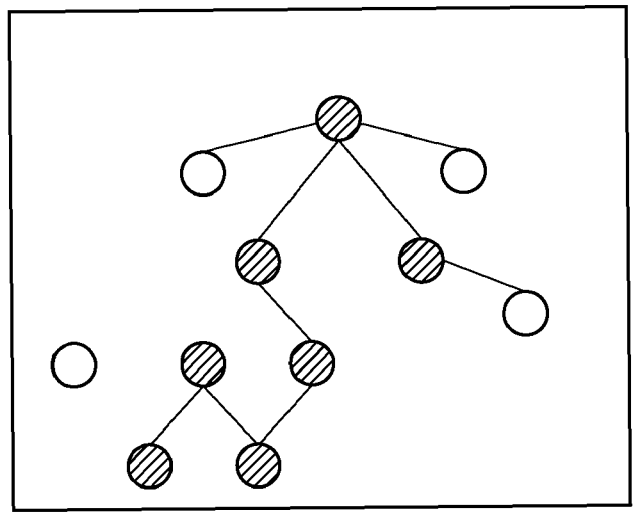
FIG. 6A is a diagram useful in describing a case where structural elements to be verified have been determined in FIG. 5.
Figure 6B:
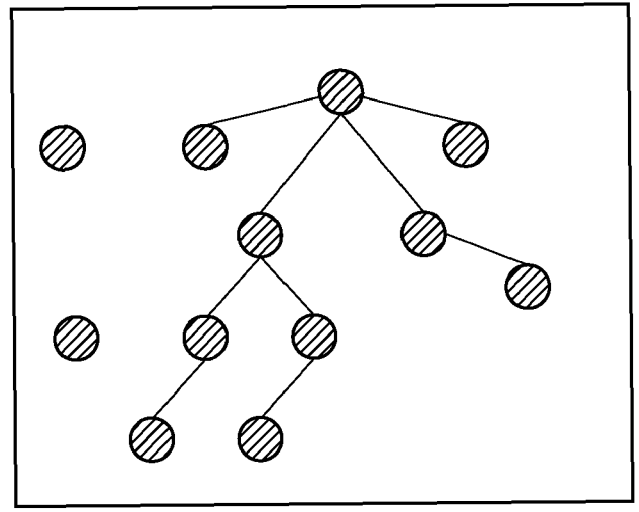
FIG. 6B is another diagram useful in describing a case where structural elements to be verified have been determined in FIG. 5.
Figure 7:
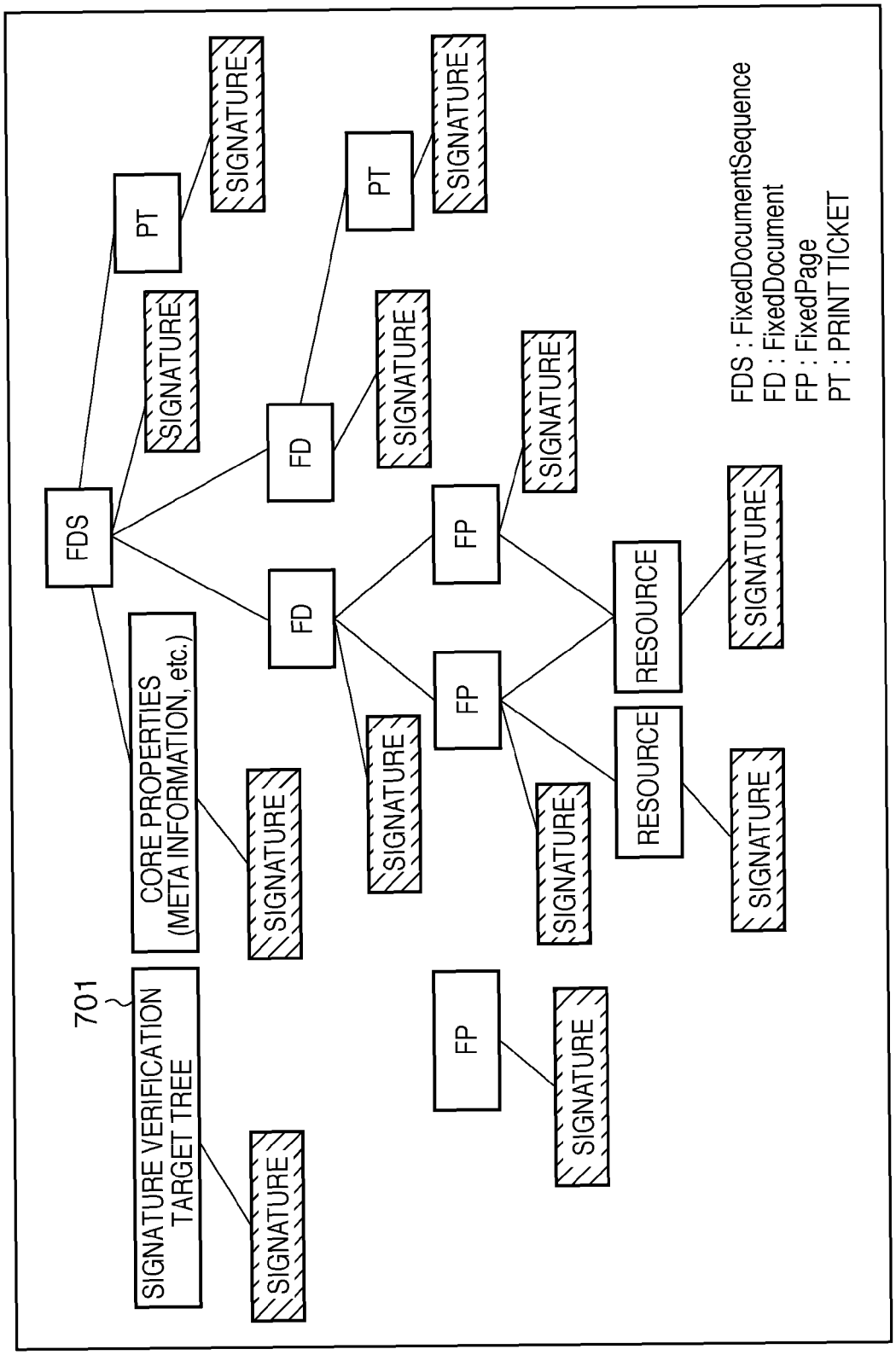
FIG. 7 is a diagram illustrating a structured document in which a signature verification target tree has been inserted.

Although the above-mentioned four rules are predetermined in this embodiment, rules relating to other attributes may also be determined. Electronic signature verification information is inserted into a document using such rules. For example, the file sharing server 103 inserts information for excluding "meta information attribute", "PT attribute" and "unlinked attribute" from verification into a document and, when verification is performed, carries out verification based upon this inserted information. For example, in the XPS shown in FIG. 4, the portions of the tree illustrated in FIG. 6A are adopted as structural elements that are to undergo verification. The tree data indicated by the tree is signature verification information in this embodiment and will be referred to below as a "signature verification target tree" according to the present invention. A signature verification target tree 701 is inserted into a structured document, as shown in FIG. 7. When verification is carried out, structural elements to undergo verification are decided based upon the signature verification target tree 701. When the document has been moved, that is, when a verification rule has been changed, the signature verification target tree is updated. For example, assume that the confidential information server 104 has been set so as not to allow structural elements that are not a target of verification. In this case, the signature verification target tree shown in FIG. 6A will be updated to the tree shown in FIG. 6B. As a result, the scope of signature verification can be changed dynamically depending upon the registration (storage) location of the document. The details will be described later.

Next, reference will be had to FIG. 8 to describe a method of registering a server, which is capable of registering a document in the document management server 102, by operating the server management application 1012. FIG. 8 is a diagram illustrating an example of a server registration screen in the server management application 1012. The user enters the server name to be registered and the IP address thereof in input fields 801, 802, respectively, and enters signature verification rules regarding this server in input areas 803, 804, 805, 806. When the user clicks a registration button 807, the server management application 1012 reports the registration information to the document management server 102 via the network 107. The document management server 102 receives this information via the network interface 1021. Based upon the registration information received, the database management unit 1023 stores a server information table of the kind shown in FIG. 9 and completes registration. Here a server to be registered can be added on, or a registered server can be deleted. Further, in this embodiment, it may be so arranged that the user can select an attribute to undergo verification (not an attribute that is to be excluded from verification) on the screen shown in FIG. 8. The described data (the server information table shown in FIG. 9) is created based upon the received registration information, as set forth above. In this embodiment, it may be so arranged that not only is a document output from the document management server 102 and registered in another server but, in addition, a document is registered in external storage that has been connected to the document management server. That is, the output destination for a document from the document management server 102 may be a server or external storage.

Figure 10:
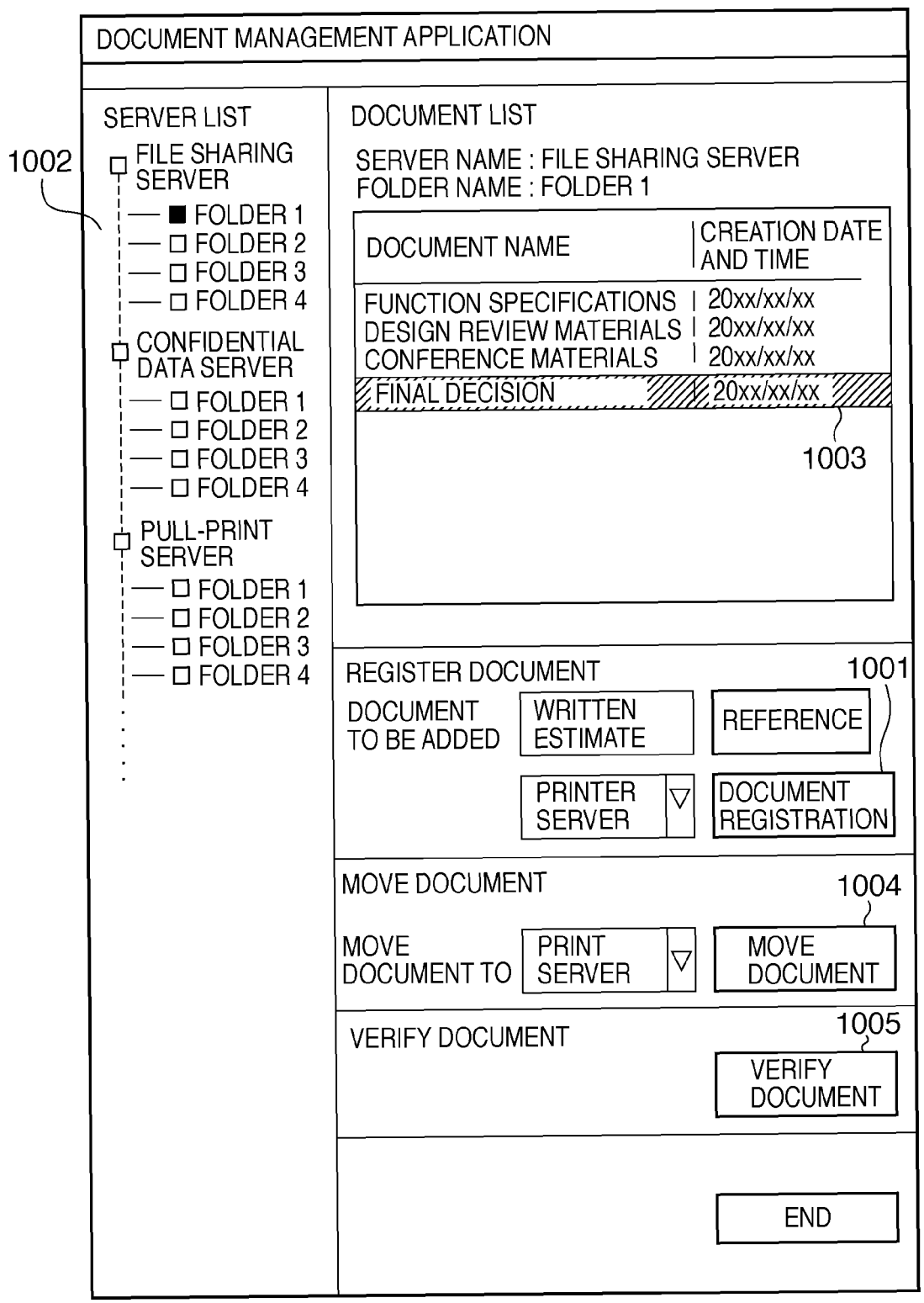
FIG. 10 is a diagram illustrating an example of a user operation screen of a document management application.

Next, reference will be had to FIG. 10 to describe a method of registering (storing) a document in the document management server 102 by operating the document management application 1011. FIG. 10 is a diagram illustrating an example of a user operation screen of the document management application 1011. The user clicks a document registration button 1001 upon designating the document to be registered and the server that is the destination of registration. Upon being received from the database management unit 1023 via the network 107, the server names in the server information table shown in FIG. 9 can be displayed in the document management application 1011 as servers that are the destinations of registration. The user selects the server that is the registration destination from the screen. If the document registration button 1001 is clicked, the document management application 1011 reports the registration information (document name, electronic document, server name to be registered, etc.) in the document management server 102 via the network 107. On the other hand, the document management server 102 receives this information via the network interface 1021. On the basis of the registration information received, the document management unit 1022 issues a document ID associating the electronic document name, the registration destination of the electronic document data and the document to be registered and stores the document ID as document information of the kind shown in FIG. 11. Furthermore, the document management unit 1022 controls the electronic signature attaching unit 1024 and the structured document analyzing unit 1026 and creates a signature verification tree, which conforms to the electronic document data name and registration destination, in the document with respect to the document that has been registered (the details will be described later). The document management unit 1022 stores the essence of the electronic document data file in the designated server, adds this reference information to the document data of the document information shown in FIG. 11 and then stores the result in the database management unit 1023. Here the reference information signifies the address at which the document data is actually stored. Further, the document ID, document name and registration server name also stored in the document information. It should be noted that in a case where a document desired to be registered is selected and is dragged and dropped in a server list 1002, processing similar to that for the case where the document registration button 1001 is clicked is executed.

Next, reference will be had to FIG. 10 to describe a method implemented when the document management application 1011 is operated and a document that has been registered is moved and when verification is carried out. The document management application 1011 receives the server information table (FIG. 9), which is being managed in the database management unit 1023, via the network 107. In response, the already registered server list is displayed in the document management application 1011 (see the server list 1002 shown in FIG. 10). Further, the document information (FIG. 11) being managed in the database management unit 1023 is received via the network 107. In response, the already registered document list is displayed in the document management application 1011 (document list 1003 shown in FIG. 10).

The user selects the document to be moved from the document list 1003, designates the server at the destination of movement and clicks a document move button 1004. When the document move button 1004 is clicked, the document management application 1011 reports the move information to the document management server 102 via the network 107. On the other hand, the document management server 102 receives this information via the network interface 1021. On the basis of the move information received, the document management unit 1022 moves the electronic document data to the designated server. Furthermore, the document management unit 1022 controls the electronic signature attaching unit 1024 and the structured document analyzing unit 1026 and updates the signature verification target tree with respect to the document moved (the details will be described later). The document management unit 1022 rewrites the registration server name, which is shown in FIG. 11, to the server at the move destination and terminates processing. It should be noted that in a case where a document desired to be moved is selected and is dragged and dropped in the server list 1002, processing similar to that for the case where the document move button 1004 is clicked is executed.

Further, if the user clicks a document verification button 1005 in a state in which a document has been selected, the document management application 1011 notifies the document management server 102 of a verification processing request via the network 107. On the other hand, the document management server 102 receives this information via the network interface 1021. On the basis of the verification processing request received, the document management unit 1022 controls the electronic signature verification unit 1025 and structured document analyzing unit 1026, executes signature verification processing with respect to the designated document and notifies the user of the result. The content of the notification is, for example, whether or not an alteration has taken place.

Before a method of generating a signature verification target tree is discussed, the internal structure of the format of an XPS file will be described. FIGS. 12A to 12D are first to fourth diagrams illustrating portions of the internal structure of the XPS file shown in FIG. 4. Owing to simplification for the sake of explanation, however, the file structure is not in line with normal XPS specifications. "FixedDocumentSequence" shown in FIG. 12A indicates a link to "FixedDocument1", "FixedDocument2" (not shown), "Job_PT.xml" and "Core_Property.xml". "FixedDocument1" is illustrated in FIG. 12B. This is one "FixedDocument". Further, "Job_PT.xml" is a print ticket illustrated in FIG. 12C. "Core_Property.xml" is meta information illustrated in FIG. 12D. Thus, each structural element is an independent file, is linked to a lower order structural element by the XML base and the entirety of the structural elements construct one structured document. This is the concept of XPS specifications. Actually, the structural elements are compressed into a ZIP file.

Figure 13:
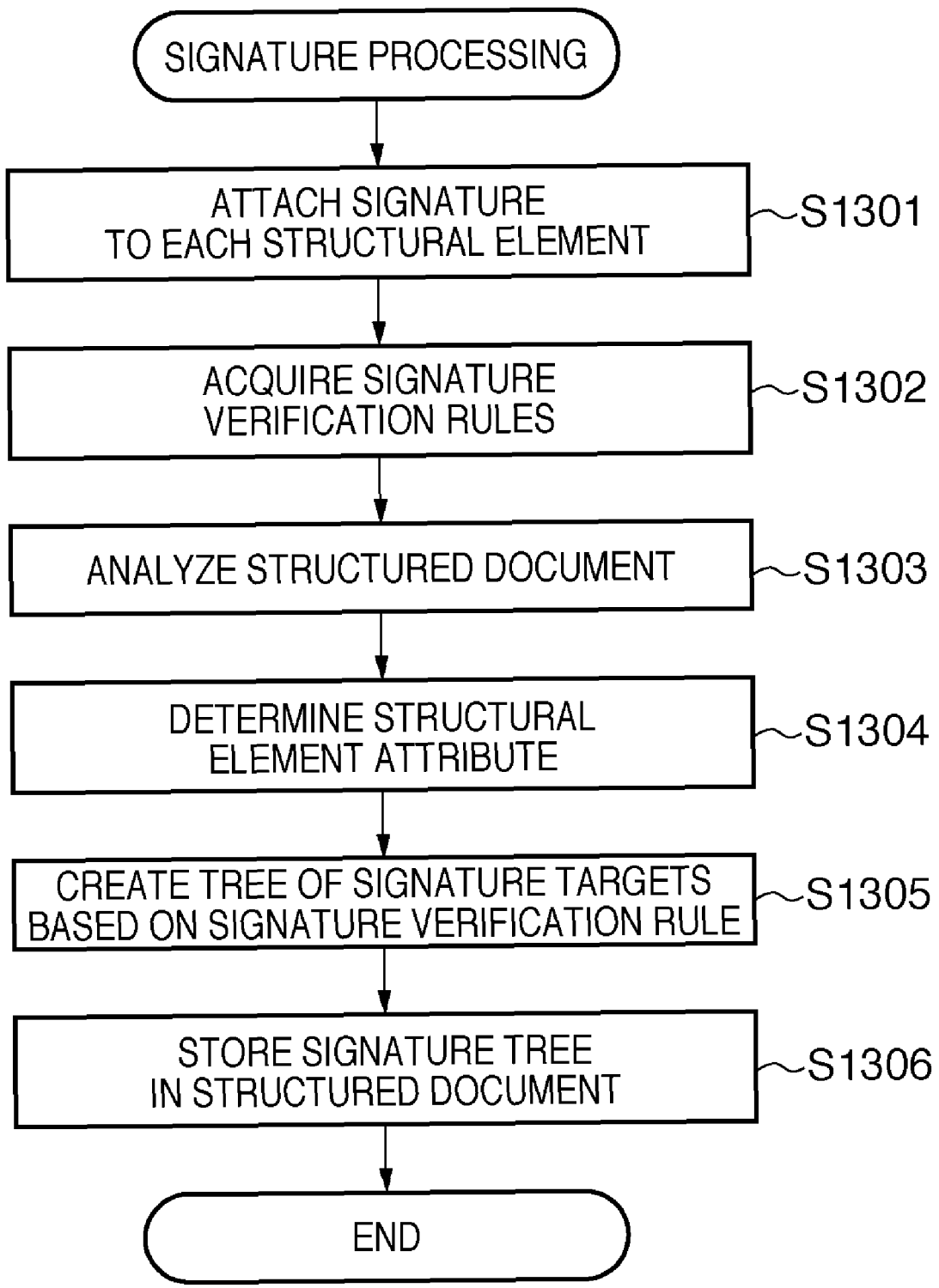
FIG. 13 is a flowchart of processing for generating a signature verification target tree in a case where a document has been registered by a document application.

Next, a method of generating a signature verification target tree in a case where a document has been registered by the document management application 1011 will be described with reference to a flowchart, which is shown in FIG. 13, relating to the program executed by the document management server 102. The description will be rendered on the assumption that a document to be registered is a structured document. In a case where a document that has been registered is not a structured document, processing for converting the document to a structured document is executed before the processing of FIG. 13. First, the document management unit 1022 controls the structured document analyzing unit 1026 and electronic signature attaching unit 1024 so as to analyze the structured document and attach an electronic signature to each element (S1301). The structured document analyzing unit 1026 analyzes the file based upon the above-described XPS specifications and then the electronic signature attaching unit 1024 applies an electronic signature to each structural element. As a result of this processing, the structured document shown in FIG. 4 becomes the structured document shown in FIG. 5. Internally, the XML structure shown in FIGS. 14A to 14D is obtained from the XML structure shown in FIGS. 12A to 12D.

Next, from the server information table (FIG. 9) being managed in the database management unit 1023, the document management unit 1022 acquires the signature verification rules for the registration-destination server designated by the user (step S1302).

Next, internal configuration information of the kind shown in FIG. 15 is generated through the processing of steps S1303 to S1305. FIG. 15 corresponds to the XPS shown in FIG. 4. Part name indicates the file name of the structural element, and tag name is the name of the tag at the head of each structural element. As a result of analyzing the link relationship of the structured document, the tree information obtained in such that a structural element from which a link is connected to a lower structural element is expressed as the "PARENT", and a structural element to which a link is connected from a higher structural element is expressed as the "CHILD". Attribute information indicates the attributes of each structural element. Here "o" indicates that the attribute is the attribute of the element, and "×" indicates that the attribute is not an attribute of the element.

First, in step S1303, the structured document to be registered is analyzed in the structured document analyzing unit 1026 and the part name and tag name of each structural element are detected with regard to each of structural elements constituting the XPS file. Next, in step S1304, the electronic signature attaching unit 1024 determines each item of attribute information (meta information, print ticket, print range exclusion, unlinked element) of each structural element and generates the portion of the attribute information in the internal configuration information. Whether an attribute is meta information or a print ticket is determined from an attribute classification table shown in FIG. 16 and the tag name shown in FIG. 15. In this embodiment, the meta information attribute is only "CoreProperty, and the print ticket attribute is only "PrintTicket". Whether an element is one for which printing is not a target is determined by analyzing the print range from the print ticket. In the example shown in FIG. 12C, "PrintRange" is "FixedDocument1.fdco" and therefore it can be determined that the structural element subordinate to "FixedDocument2.fdoc" is one for which printing is not a target. Further, as a result of following links successively from "FixedDocumentSequence", "unlinked attribute" is determined for structural elements not connected by links anywhere.

Next, in line with the signature verification rules in the server information table (FIG. 9) read in at step S1302, the electronic signature attaching unit 1024 determines whether each of the structural elements is a structural element that is excluded from signature verification. For example, in a case where the server at the destination of registration is a file sharing server, the electronic signature attaching unit 1024 refers to "FILE SHARING SERVER" in the server information table of FIG. 9 and compares the attribute flags with the attribute information shown in FIG. 15 at step S1305.

For example, the structural element "FixedDocument1" in FIG. 15 does not fall under any attribute information. In the server information table of FIG. 9, as mentioned above, the items of attribute information "META INFORMATION", "PRINT TICKET" and "UNLINKED" are indicated as being excluded from verification with regard to the file sharing server. Accordingly, the structural element "FixedDocument1" in FIG. 15 is determined to be the subject for verification (i.e., it is marked "o").

Further, the structural element "Job_PT" in FIG. 15 falls under the print ticket attribute. In the server information table of FIG. 9, as mentioned above, the attribute information "PRINT TICKET" is indicated as being excluded from verification with regard to the file sharing server. Accordingly, it is determined that the structural element "Job_PT" in FIG. 15 is excluded from verification (i.e., it is marked "×").

When the above-described processing is executed, the internal configuration information shown in FIG. 15 can be generated in the case of the XPS shown in FIG. 4 (FIGS. 12A to 12D) and if the registration destination is the file sharing server. An example of this internal configuration information placed in the form of XML is illustrated in FIGS. 17A and 17B. The structural element "Sign=True" in FIGS. 17A and 17B is a structural element that is to be verified at the time of verification. The XML illustrated in FIGS. 17A and 17B is a signature verification target tree. Finally, in step S1306, the signature verification tree is stored in the XPS document and processing is exited. An example of the XPS document containing the signature verification tree is illustrated in FIG. 18. It should be noted that only the portion that links the signature verification tree is illustrated in FIG. 18. Further, FIG. 7 is a diagram illustrating this concept.

Next, a method of updating a signature verification target tree in a case where a document registration destination has been moved by the document management application 1011 will be described with reference to the flowchart of FIG. 19 relating to a program executed by the document management server 102. Processing executed when the XPS file (a document that has been registered in the file sharing server) used in FIGS. 7, 15, 17, 18 is moved to the confidential information server 104 will be described as an example. First, when a command to move the document is issued by user operation, the document management unit 1022 acquires the signature verification rules of the move-destination server designated by the user from the server information table (FIG. 9) being managed in the database management unit 1023 (step S1901). Since the document is moved to the confidential information server 104 in this example, reference is had to "CONFIDENTIAL INFORMATION SERVER" in FIG. 9.

Next, the signature verification target tree is updated through the processing of steps S1902 to S1904. First, the document management unit 1022 controls the structured document analyzing unit 1026 so as to analyze the structured document and acquire the signature verification target tree from the structured document (steps S1902, S1903). In this example, FIGS. 17A and 17B are the signature verification target tree and the relevant file path has been described in the portion "<SignatureTree>" under "FixedDocumentSequence" shown in FIG. 18. Next, the document management unit 1022 controls the structured document analyzing unit 1026 and electronic signature attaching unit 1024 so as to update the signature verification target tree.

For example, the structural element "FixedDocument1" in FIG. 15 does not fall under any attribute information. In the server information table of FIG. 9, no attribute information to be excluded from verification has been designated with regard to the confidential information server. Accordingly, the structural element "FixedDocument1" in FIG. 15 remains as a target of verification (i.e., it remains marked "o").

Further, the structural element "Job_PT" in FIG. 15 falls under the print ticket attribute. In the server information table of FIG. 9, as mentioned above, no attribute information to be excluded from verification has been designated with regard to the confidential information server. Accordingly, it is determined that the structural element "Job_PT" in FIG. 15 is a target of verification (i.e., the mark is changed to the "o" mark).

If the above-described processing is executed, the internal configuration information is updated, as illustrated in FIG. 20. In this example, the signature verification rules for the confidential information server do not designate an attribute for which verification is excluded. The verification target information shown in FIG. 20, therefore, is marked "o" throughout. An example of this internal configuration information is the form of XML is depicted in FIGS. 21A and 21B. Unlike FIGS. 17A and 17B, all of the structural elements are structural elements to be verified at the time of verification processing (this is indicated as "Sign=True"). By thus updating the signature verification target tree in the manner described above, the scope of signature verification can be changed dynamically.

Next, a verification method in a case where a document verification command has been issued by the document management application 1011 will be described with reference to the flowchart of FIG. 22 relating to a program executed by the document management server 102. Processing executed when the XPS file (a document that has been registered in the file sharing server) used in FIGS. 7, 15, 17, 18 is verified will be described as an example. When a command to verify the document is issued by user operation, the document management unit 1022 controls the structured document analyzing unit 1026 so as to analyze the structured document and acquire the signature verification target tree from the structured document (steps S2201, S2202). In this example, FIGS. 17A and 17B are the signature verification target tree and the relevant file path has been described in the portion "<SignatureTree>" under "FixedDocumentSequence" shown in FIG. 18.

Next, the document management unit 1022 controls the structured document analyzing unit 1026 and electronic signature verification unit 1025 so as to apply verification processing to all structural elements indicated as being the target of signature verification in the signature verification target tree (i.e., to structural elements other structural elements excluded from verification). Structural elements indicated by "Sign=True" in the signature verification target tree of FIGS. 17A and 17B are made structural elements subject to signature verification. The referential information for each structural element can be acquired by following link information such as "Target=FixedDocumentSequence.fdeq" shown in FIGS. 17A and 17B. Processing for verifying each structural element is executed and if there is even one structural element that has been altered, this document is determined to be "ALTERED" and the user is notified to this effect. By thus performing verification with regard to structural elements that have been determined to be subject to verification based upon the signature verification target tree, it is possible to verify whether or not there has been alteration of structural elements to be protected at the registration destination of the document.

Thus, as described above, when a document is registered by a document management system, and when a document is moved within a document management system, a signature verification target tree is created or updated, whereby the scope of signature verification can be changed dynamically in conformity with the document location (storage location). For example, print settings can be excluded from signature verification in a file sharing server and can be made a target of signature verification in a pull-print server. Further, since the signature verification target tree has a link structure, it can be changed with ease and it is unnecessary to re-attach signatures per se in accordance with the location of the document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-024259, filed Feb. 4, 2008, which is hereby incorporated by reference herein in its entirety.

What is claimed is:

1. An information processing apparatus which outputs a structured document including a plurality of structural elements, the apparatus comprising:
a storage unit that stores attribute information in association with an output destination of the structured document, the attribute information indicating which structural element among the plurality of structural elements is to be a target of electronic signature verification; and
an inserting unit that generates tree data with reference to the attribute information corresponding to the output destination and inserts the generated tree data into the structured document to be output,
wherein the tree data indicates a tree-shaped structure of the plurality of structural elements included in the structured document to be output and, in the tree data, performance of electronic signature verification is defined with respect to a structural element to be the target of electronic signature verification,
wherein the structured document includes, as structural elements of the plurality of structural elements, meta information and a document, and
wherein in the case where the output destination is a first output destination, the structural element of the plurality of structural elements indicating the meta information is not the target of electronic signature verification and the structural element indicating the document is the target of electronic signature verification, and in the case where the output destination is a second output destination, for which security is higher than for the first output destination, the structural elements indicating the meta information and the document are the targets of electronic signature verification.

2. The apparatus according to claim 1, wherein when the output destination is changed, the tree data previously generated by said inserting unit is updated according to the changed output destination.

3. The apparatus according to claim 1, wherein the attribute information includes meta information, a print ticket, a print range exclusion, and verification target information.

4. The apparatus according to claim 1, further comprising:
a display unit that displays a screen for registering a server name as the output destination, and attribute information excluded from verification.

5. The apparatus according to claim 1, wherein the first output destination is a file sharing server, and the second output destination is a confidential information server.

6. The apparatus according to claim 1, wherein the first output destination is a printer, and the second output destination is a server.

7. An information processing method that processes a structured document to be output, the structure document including a plurality of structural elements, said method comprising:
storing attribute information in association with an output destination of the structured document, the attribute information indicating which structural element among the plurality of structural elements is to be a target of electronic signature verification;
generating tree data with reference to the attribute information corresponding to the output destination; and
inserting the generated tree data into the structured document to be output,
wherein the tree data indicates a tree-shaped structure of the plurality of structural elements included in the structured document to be output and, in the tree data, performance of electronic signature verification is defined with respect to a structural element to be the target of electronic signature verification,
wherein the structured document includes, as structural elements of the plurality of structural elements, meta information and a document, and
wherein in the case where the output destination is a first output destination, the structural element of the plurality of structural elements indicating the meta information is not the target of electronic signature verification and the structural element indicating the document is the target of electronic signature verification, and in the case where the output destination is a second output destination, for which security is higher than for the first output destination, the structural elements indicating the meta information and the document are the targets of electronic signature verification, and
wherein at least the generating and inserting steps are performed using a central processing unit of a computer.

8. A non-transitory computer-readable medium embodying a program for causing an apparatus to perform an information processing method that processes a structured document to be output, the structure document including a plurality of structural elements, the method comprising:
storing attribute information in association with an output destination of the structured document, the attribute information indicating which structural element among the plurality of structural elements is to be a target of electronic signature verification;
generating tree data with reference to the attribute information corresponding to the output destination; and
inserting the generated tree data into the structured document to be output,
wherein the tree data indicates a tree-shaped structure of the plurality of structural elements included in the structured document to be output and, in the tree data, performance of electronic signature verification is defined with respect to a structural element to be the target of electronic signature verification,
wherein the structured document includes, as structural elements of the plurality of structural elements, meta information and a document, and
wherein in the case where the output destination is a first output destination, the structural element of the plurality of structural elements indicating the meta information is not the target of electronic signature verification and the structural element indicating the document is the target of electronic signature verification, and in the case where the output destination is a second output destination, for which security is higher than for the first output destination, the structural elements indicating the meta information and the document are the targets of electronic signature verification.

\* \* \* \* \*